UNITED STATES PATENT OFFICE.

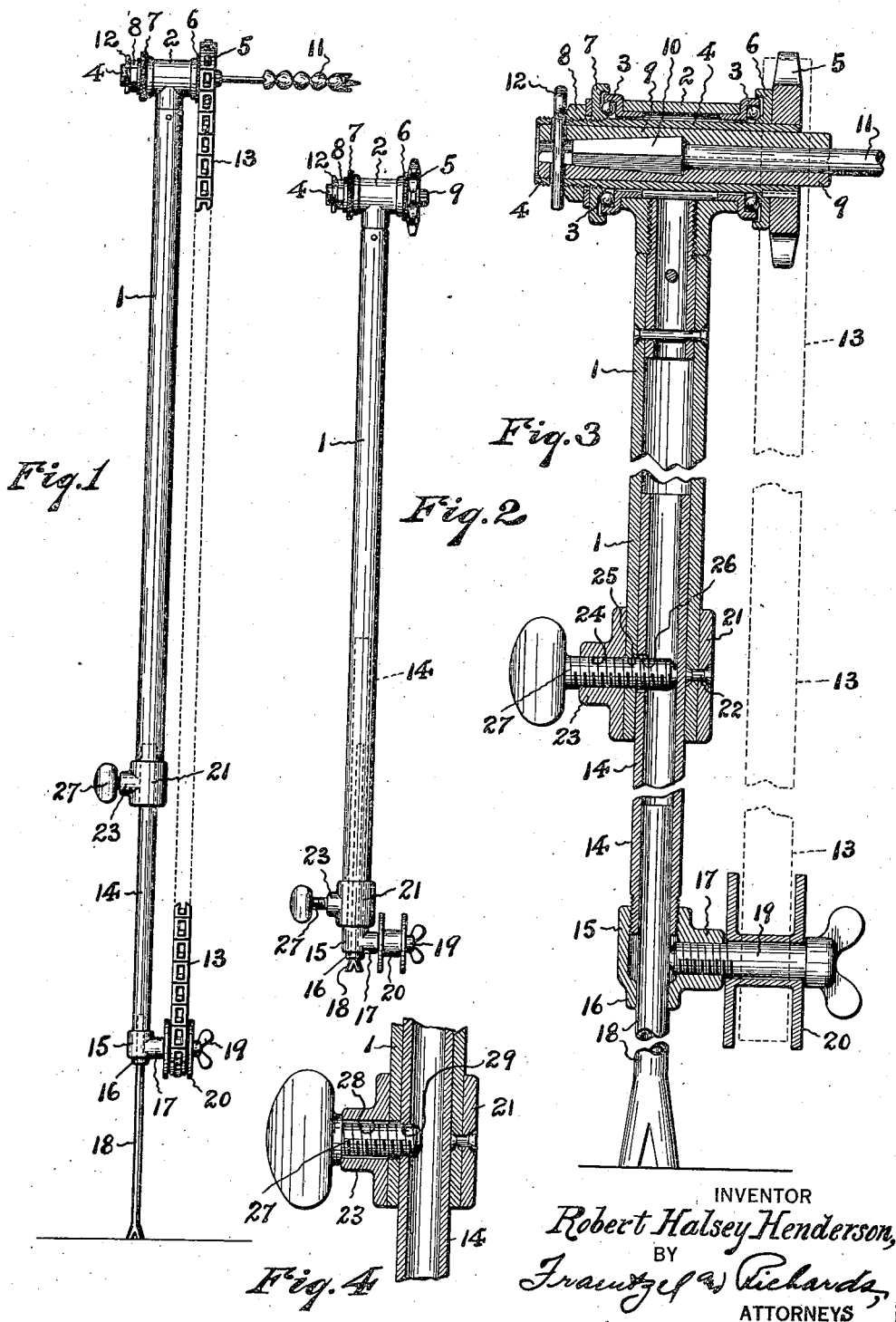

ROBERT HALSEY HENDERSON, OF EAST ORANGE, NEW JERSEY.

COLLAPSIBLE JOIST-BORING MACHINE.

1,426,476.  Specification of Letters Patent.  Patented Aug. 22, 1922.

Application filed March 13, 1920. Serial No. 365,413.

*To all whom it may concern:*

Be it known that I, ROBERT HALSEY HENDERSON, a citizen of the United States, residing at East Orange, in the county of Essex and State of New Jersey, have invented certain new and useful Improvements in Collapsible Joist-Boring Machines; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in collapsible joist boring machines provided with a chain driven rotatable head at its upper end carrying a chuck for connecting therewith a suitable boring bit, and an idler pulley adjacent to its lower end for guiding the driving chain; and the invention has reference, more particularly, to a novel clamp joint for interlocking the telescopically associated column or standard sections in extended operative relation so as to firmly hold the same against accidental collapse, and so as to aline the same to support the driving chain between the head and said idler pulley in true running alinement at proper tension.

In such telescopically collapsible joist boring machines it is essential that the locking joints between the tubular column or standard sections serve to firmly hold said sections against accidental collapse, when extended, at a fixed predetermined point and in correct alinement so that the endless driving chain may run freely and true between the head sprocket and the guiding idler pulley; and, furthermore, said joints must be capable of being frequently tightened and released without causing injury to the sections themselves, such as distortions or scorings of the overlapping surfaces of the sections tending to interfere with or obstruct the mutual sliding relation of the same, so that said sections are maintained in a condition rendering repeated telescopic collapse of the same freely and easily accomplished.

Heretofore two styles of joints have been generally used; a strap clamp, passing around the joint and adapted to shrink the larger tubular section in hugging or gripping relation to the smaller tubular section at the point of over-lap; in some instances two or three of such strap clamps are used at a single joint in an effort to render the latter strong enough; the other form of clamp consists of an ordinary jam screw passing through a threaded boss connected with the larger tubular section, and depending for its holding power upon the point or cup end of the jam screw biting into the outside surface of the smaller tubular section. Both of the types of clamps tend to either distort or score the smaller tubular section with the result that smooth and easy sliding relations of the sections is interfered with. Neither of said type of clamps, in themselves, furnish any guide or means assuring that the respective sections will be locked at a predetermined point each time so that a proper tension and true alinement of the driving chain of the mechanism is also assured each time the mechanism is set up, and in fact the operator, when dependent upon such clamps, must rely upon his eye to aline the chain, and must guess at the tension produced. Consequently if the chain does not run true or is too tight, both the chain and the bearings of the rotatable head are subjected to undue strains and unnecessary wear, as is also the idler pulley, and since a chain that runs at proper tension, in other words with proper degree of freedom, will easily bore holes under a minimum of power application, therefore a chain which is too tight requires unnecessary effort to be exercised by the operator. Furthermore, when clamps of the kind above mentioned are employed, the same are likely to accidentally release themselves, permitting untimely collapse of the sections and disengagement of the chain from operative relation to the mechanism.

My present invention has for its principal object to provide a self aligning clamp joint for interlocking telescopic tubular standard sections of boring machines, and the like, in predetermined relative positions and securely against accidental collapse, whereby the objectionable features incident to the use of old style clamps as above pointed out are substantially eliminated.

The invention is clearly illustrated in the accompanying drawings, in which:—

Figure 1 is a side elevation of a collapsible joist boring machine in extended operative position, the same being made according to and embodying the principles of my present invention.

Figure 2 is a similar view of said joist boring machine in collapsed position, the driving chain thereof being removed.

Figure 3 is a vertical longitudinal section of said collapsible joist boring machine in extended operative position, said view being drawn on an enlarged scale, and portions thereof being broken away to reduce the length thereof to permit illustration of all its essential parts.

Figure 4 is a detail longitudinal section of a slightly modified form of the novel clamp joint.

Similar characters of reference are employed in all of the hereinabove described views, to indicate corresponding parts.

Referring now to said drawings, the reference character 1 indicates an upper tubular column or standard section, to the upper end of which is fixed a T head 2 provided with ball anti-friction bearings 3. Journaled in said bearings 3 is horizontal hollow shaft 4 provided at one exterior end with a sprocket wheel 5 and a bearing face 6 which rides against one set of said ball bearings. The opposite end of hollow shaft is exteriorly threaded, and a bearing face 7 is engaged over the same and secured in operative relation to the opposite set of said ball bearings by means of a nut 8 which screws upon said threaded shaft end. Arranged within said hollow shaft is a split chuck-sleeve 9, made in two semi-cylindrical longitudinal sections, and adapted to conform to and embrace the butt 10 of a boring bit 11 which projects outwardly from the end of said shaft beyond the sprocket wheel 5. Said chuck sleeve 9 is secured against withdrawal from said hollow shaft, and at the same time connected therewith to receive therefrom and impart to said boring bit 11 operative rotary motion, by means of a transverse coupling pin or key 12. Running over said sprocket wheel 5 is an endless link belt or drive chain 13.

The reference-character 14 indicates a lower tubular column or standard section, which is slidably received within the lower end of said column or standard section 1 so as to telescope thereinto. The lower extremity of said column or standard section 14 is provided with an exteriorly disposed fitting 15 threaded thereto, and provided at its free end with a portion 16 of reduced diameter. Said fitting 15 is provided with a laterally projecting internally threaded boss 17. Telescopically slidable into the lower end of said column or standard section 14, through the reduced portion 16 of said fitting 15, is an extensible leg or foot piece 18. The reference-character 19 indicates a set screw which screws into said threaded opening of said boss 17, so as to engage and lock said leg or foot piece 18 in any desired adjusted extended position relative to said column or standard section 14. Said set screw 19 is of a length sufficient to project far enough outwardly from said boss 17 to provide a journal or bearing for a flanged idler pulley 20, which is mounted thereon for free rotation. The lower loop or end of said link belt or chain 13 runs over and is guided by said flanged idler pulley 20.

The novel arrangement of clamp joint for interlocking said respective column or standard sections 1 and 14 together in operative extension, and which is adapted to firmly secure the same against accidental collapse when the machine is in use, and which further serves to automatically aline the sprocket wheel carried by the upper section with the idler pulley carried by the lower section, and at the same time predetermines the operative spaced relation of said idler pulley from said sprocket wheel so that the link belt or driving chain running over the same is assured of being operatively mounted to run under the desired tension, as well as in true running alinement, comprises a sleeve 21 fixed to embrace the lower extremity of said upper section 1, by means of a rivet 22, or any other suitable fastening means. Said sleeve 21 is provided with a laterally projecting boss 23 having an internally screw-threaded opening 24, an opening 25 registered with the said threaded opening 24 being provided in the wall of said section 1. The wall of said lower tubular section 14 is provided, at one side adjacent to its upper extremity, with an opening or eye 26, which, when said lower section 14 is moved to outwardly extended operative relation to said upper section 1, is brought into alinement with the threaded opening 24 of said boss 23. A lock or thumb screw 27 screws through said threaded opening 24 of said boss 23, and when said lower section 14 is extended to operative position and the opening or eye 26 brought into alinement with said lock or thumb screw 27, the latter may be screwed inwardly to pass its extremity through the said opening or eye 26, so that its said extremity may be moved into binding or holding relation to said lower section 14 by engaging the inner surface of the wall of the latter at a point diametrically opposite said opening or eye 26, thus locking the two sections 1 and 14 together in operative extended relation. Since the biting extremity of said lock or thumb screw does not engage the outer surface of the lower section 14, which meets and slides against the inner surface of the upper section 1, there ensues no scoring, distortion or other injury to said sliding surface likely to interfere with or obstruct the easy telescopic collapsing or extending operations of the mutually related upper and lower sections 1 and 14. Furthermore, even though the lock or thumb screw 27 becomes accidentally loosened, collapse of the operatively extended sections does not follow, since the shank of the screw 27 in passing through the eye or opening 26 of the lower section, so engages the latter as to prevent accidental dropping or collapsing of the upper section, and no collapsing of said sections can take place until the said screw 27 is entirely withdrawn out of the opening or eye 26. Since the opening or eye 26 is carefully positioned in the manufacture of the machine so as to predetermine both the alinement of the sections 1 and 14 to properly oppose the sprocket wheel 5 and idler pulley 20, as well as to assure the proper longitudinal spacing of the same whereby the free running tension of the drive chain is secured, it follows that the passing of the screw 27 therethrough to operative binding or locking position, likewise automatically alines the drive chain at proper running tension, with all consequent advantages above mentioned.

Adjustments tending to vary the operative elevation of the boring bit head from the floor are made by regulating the projection of the leg or foot piece 18 from the lower end of the lower section 14, once the main column or standard sections 1 and 14 are locked in operative extended relation.

Referring now to Figure 4 I have shown a sligthly modified arrangement and construction of clamp joint, which still embodies the general principles of my present invention. In this construction I provide the sleeve 21 having the lateral boss 23, but instead of threading the opening of said boss I provide a clearance opening 28. The adjoining end of the lower section 14 is provided with a threaded aligning opening or eye 29 with which the threaded shank of said lock screw 27 may be engaged after passing through said clearance opening 28.

It will be apparent that the clamp joint thus modified will, nevertheless serve all the purposes and obtain all the advantages already pointed out in connection with the first described construction.

It will, of course, be understood that two or more column or standard sections, with requisite novel interlocking clamp joints, may be employed.

Having thus described my invention in detail, I claim:—

In a joist boring machine, a collapsible standard comprising a plurality of telescopically associated tubular sections of circular cross sectional shape, the upper section carrying a rotatable boring bit head having a driving sprocket, the lower section carrying an idler pulley, an endless drive chain running over and between said sprocket and idler pulley, and means for interlocking said sections in predetermined extended relation whereby said sprocket and idler pulley are vertically alined in proper spaced relation to establish the straight running of said drive chain at proper tension, said means comprising a thumb screw in transverse threaded relation to the end of one section, the engaging end of the adjoining section having an aligning eye in its wall through which the biting end of said thumb screw is passed to binding engagement with the opposite inner surface of said section, to force said section in clamped relation to the other section and securely held against wabbling.

In testimony, that I claim the invention set forth above I have hereunto set my hand this 11th day of March, 1920.

ROBERT HALSEY HENDERSON.

Witnesses:
GEORGE D. RICHARDS,
BARBARA W. SUTTERLIN.